3,404,170
PREPARATION OF ISOCYANATES
Henri Ulrich, North Branford, Conn., assignor to The Upjohn Company, Kalamazoo, Mich., a corporation of Delaware
No Drawing. Filed Sept. 27, 1965, Ser. No. 490,650
10 Claims. (Cl. 260—453)

ABSTRACT OF THE DISCLOSURE

A process for the conversion of an N-hydrocarbylurethane to the corresponding hydrocarbyl isocyanate. The urethane is reacted with phosgene at 25° C. to 180° C. (preferably 80° C. to 150° C.) in the presence of a catalytic quantity of an N,N-dialkyl-aliphatic amide (e.g. dimethylformamide) or an N,N,N', N'-tetraalkylurea.

This invention relates to a novel process for the preparation of hydrocarbyl isocyanates and is more particularly concerned with a process for the preparation of hydrocarbyl isocyanates from the corresponding N-hydrocarbylurethanes.

Various attempts to prepare hydrocarbyl isocyanates from urethanes have been reported in the literature. Folin, Am. Chem. J., 19, 323, 1897, obtained aryl isocyanates by the reaction of N-arylurethanes with phosphorus pentachloride. Gross et al., Berichte, 96, 1387, 1963, obtained alkyl isocyanates by heating N-alkylurethanes with catechylphosphorus trichloride. Both the Folin and the Gross et al. methods suffer the disadvantage that the yields of product isocyanate are generally low and the isocyanates are difficult to separate from the phosphorus compounds used as reagents.

Bortnick et al. J. Am. Chem. Soc., 78, 4358, 1956, found that N-alkylcarbamates dissociate rapidly into the corresponding isocyanates on heating at 170° to 230° C. in the presence of strong bases. The authors show that this method can be used successfully to produce tert.-alkyl isocyanates but that it is less useful for the preparation of primary alkyl isocyanates due to polymerization of the latter in the presence of the basic catalyst employed in the reaction.

The pyrolysis of carbamates to produce isocyanates is described in U.S. Patent 2,409,712.

The present invention provides a process for the preparation of isocyanates from carbamates which process gives good yields of the desired isocyanates and is free from the disadvantages possessed by the prior art processes.

The present invention in its broadest aspect comprises a process for the preparation of a hydrocarbyl isocyanate which comprises reacting the corresponding N-hydrocarbylurethane with phosgene in the presence of a compound having the formula R—CONR$_1$R$_2$ (I) wherein R$_1$ and R$_2$ each represents lower-alkyl and R is selected from the group consisting of hydrogen, lower-alkyl and —NR$_1$R$_2$.

The term "lower-alkyl" as used throughout the specification means alkyl from 1 to 8 carbon atoms, inclusive, such as methyl, ethyl, propyl, butyl, pentyl, hexyl, heptyl, octyl, and isomeric forms thereof. The term "hydrocarbyl" as used throughout this specification means the monovalent and polyvalent radicals obtained by removing one or more hydrogen atoms from the parent hydrocarbon, preferably a hydrocarbon containing from 1 to 18 carbon atoms, inclusive.

Illustrative of monovalent hydrocarbyl are alkyl such as methyl, ethyl, propyl, butyl, pentyl, hexyl, octyl, decyl, dodecyl, hexadecyl, octadecyl, and the like, including isomeric forms thereof; alkenyl such as allyl, butenyl, pentenyl, hexenyl, octenyl, and the like including isomeric forms thereof; aralkyl such as benzyl, phenethyl, phenylpropyl, benzhdryl, napththylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl, and the like including isomeric forms thereof.

Illustrative of divalent hydrocarbyl are arylene such as phenylene, tolylene, naphthylene, and the like; alkylene such as methylene, ethylene, trimethylene, 1,2-propylene, hexylene, octylene, dodecylene and the like; alkylene interrupted by arene such as

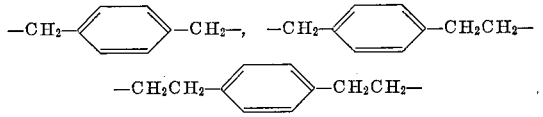

and the like; alkylenediaryl such as methylenediphenyl, methyleneditolyl, methylenedinaphthyl and the like; cycloalkylene such as 1,2-cyclopentylene, 1,3-cyclohexylene, 1,2-cycloheptylene, 1,4-cycloheptylene, 1,3-cyclooctylene, and the like.

Illustrative of trivalent hydrocarbyl are alkanetriyl such as 1,1,2,3-propanetriyl, 1,2,4-butanetriyl, 1,3,4-hexanetriyl, 1,3,8-octanetriyl, and the like; alkenetriyl such as 1-propane-1,2,3-triyl, 1-butene-1,2,4-triyl, 2-hexene-1, 3, 4-triyl, 3-octene-1,3,8-triyl, and the like; arenyl (trivalent aromatic hydrocarbyl) such as phenenyl, tolenyl, e.g.

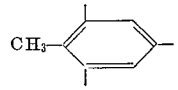

xylenyl, e.g.

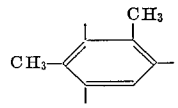

and the like.

Said monovalent and polyvalent hydrocarbyl groups can be unsubstituted i.e. can be free of groups other than those containing exclusively carbon and hydrogen, or can be substituted by one or more groups such as cyano; nitro; halo (i.e. chloro, bromo, fluoro, and iodo); hydroxy; alkoxy, for example, methoxy, ethoxy, propoxy, butoxy, pentyloxy, hexyloxy, and isomeric forms thereof; alkylmercapto, for example, methylmercapto, ethylmercapto, propylmercapto, butylmercapto, pentylmercapto, hexylmercapto, and isomeric forms thereof; alkenyloxy, for example, allyloxy, butenyloxy, pentenyloxy, hexenyloxy, and isomeric forms thereof; and the like.

The term "N-hydrocarbylurethane" which is employed to define the starting materials used in the process of the invention means an ester of carbamic acid which is substituted on the N atom thereof by a hydrocarbyl group as hereinbefore defined. The esterifying group employed in said carbamate can be any hydrocarbyl group as hereinbefore defined but is preferably a lower-alkyl group as defined above. The term "N-hydrocarbylurethane" is inclusive of compounds containing more than one urethane moiety and such compounds, when submitted to the process of the invention, give rise to the corresponding isocyanates having one isocyanato group for each urethane moiety present in the starting material.

The N-hydrocarbylurethanes employed as starting materials in the process of the invention can, for the most part, be represented by the following formula:

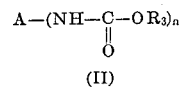

(II)

wherein $n$ is an integer from 1 to 3, A is hydrocarbyl having a valency $n$, as hereinbefore defined, and $R_3$ represents hydrocarbyl, preferably lower-alkyl. The compound (II) when submitted to the process of the invention gives rise to the corresponding isocyanate $A—(NCO)_n$ wherein A and $n$ are as hereinbefore defined.

In carrying out the process of the invention the N-hydrocarbylurethane employed as starting material is reacted with phosgene in the presence of an inert organic solvent and a catalytic amount of the amido compound (I). The inert organic solvent can be any organic solvent which is inert under the conditions of the reaction i.e. does not enter into reaction with any of the reactants employed therein or in any way interfere with the progress of the reaction. Examples of inert organic solvents are toluene, xylene, naphthalene, decalin, chlorobenzene, o-dichlorobenzene and the like.

Advantageously the mixture of N-hydrocarbylurethane, inert organic solvent and amido compound (I) is maintained at a temperature within the range of about 25° C. to about 180° C., preferably at a temperature within the range of about 80° C. to about 150° C., while phosgene is added to the reaction mixture at any desired rate. The amount of phosgene employed is preferably of the order of about 1 molar proportion per mole of N-hydrocarbylurethane for each urethane moiety present in the latter. However, higher or lower proportions of phosgene can be employed without detracting substantially from the yield-time performance of the reaction. As will be appreciated by one skilled in the art the upper limit of amount of phosgene employed is dictated largely by economic considerations.

The proportion of amido compound (I) employed in the process of the invention is advantageously within the range of about 1 percent to about 20 percent by weight based on N-hydrocarbylurethane present in the reaction. Preferably the amount of amido compound (I) is of the order of about 2 percent to about 5 percent by weight based on N-hydrocarbylurethane present. Amounts of amido compound (I) in excess of the above upper limit can be employed if desired but offer no advantages in terms of increased yield or accelerated rate of reaction. The amido compound (I) can be added to the reaction mixture in one batch at the start of the operation or it can be added portionwise during in the course of the reaction.

The progress of the conversion of the starting N-hydrocarbylurethane to the desired isocyanate can be followed by appropriate analytical techniques, for example, by infrared spectrographic analysis. When the conversion is complete the desired isocyanate can be isolated from the reaction mixture by conventional procedures. For example, the excess phosgene present in the reaction mixture can be removed by purging with nitrogen, argon, carbon dioxide, or like inert gases. The desired isocyanate can be separated from the organic solvent and amido compound (I) by conventional procedures such as fractional distillation, chromatography and the like, and can be purified, if desired, by distillation, chromatography, countercurrent distribution, and the like. The inert organic solvent employed as reaction medium in the process of the invention is advantageously chosen in any particular instance so that its boiling point differs sufficiently from that of the isocyanate to be produced to enable ready separation of isocyanate and solvent by distillation.

Examples of amido compounds having the Formula I which are employed in the role of catalysts in the process of the invention as N,N-dimethylformamide, N,N-dimethylacetamide, N,N-diethylacetamide, N,N-dimethylbutyramide, N,N-diisopropylbutyramide, N,N-dimethylhexanoamide, N,N,N',N'-tetramethylurea, N,N-dimethyl-N',N'-diethylurea, N,N-diisopropyl-N',N'-diethylurea, N,N-dihexyl-N',N'-dimethylurea, N,N' - dimethyl - N,N'-diethylurea, N-methyl-pyrrolidone and the like.

The N-hydrocarbylurethanes employed as starting materials are for the most part known compounds which can be prepared by procedures conventional in the art for the preparation of N-substituted carbamates. One of the most convenient methods involves the reaction of the appropriate chloroformate and the appropriate hydrocarbylamine; see, for example, H. von. Pechmann, Berichte, 28, 855, 1895 for a description of the preparation of ethyl N-methylurethane from methylamine and ethyl chloroformate as representative of the conditions required in preparing the series of compounds. Another method for the preparation of N-substituted carbamates involves the reaction of the corresponding N-substituted carbamyl halide with the appropriate alcohol, for example, using the procedure described by Gattermann, Annalen 244, 30, 1888 for the reaction of carbamyl chloride itself with alcohols.

N-substituted carbamates can also be obtained by the alkylation of olefins with urethane (ethyl carbamate) as described by Mueller and Merten, Ber. 98, 1097 (1965) and by condensation of aldehydes with alkyl carbamates as described, for instance, by Bischoff, Ber. 7, 628, 1874.

It is to be noted that where the hydrocarbyl moiety of the N-hydrocarbylurethane starting material contains a substituent which is susceptible to attack by phosgene said substituent will be converted or modified by reaction with phosgene during the course of the process of the invention. For example, where said starting material contains a labile hydroxy group as substituent said group will be replaced by chlorine during the course of the reaction. Thus, ethyl 1 - hydroxy - 2,2,2 - trichloroethylcarbamate is converted to 1,2,2,2-tetrachloroethyl isocyanate by the process of the invention.

The isocyanates produced by the process of the invention are, for the most part, compounds which are well known in the art and which are well known in the art to be useful as intermediates in chemical synthesis. Illustratively the hydrocarbyl diisocyanates and higher polyisocyanates produced by the process of the invention are known to be useful as intermediates in the synthesis of polymers particularly polyurethanes; see, for example, Saunders et al., supra, part II, 1964. The hydrocarbyl monoisocyanates are likewise known to be useful as chemical intermediates; for example, they can be converted to the corresponding carbodiimides, using catalytic procedures such as those described in U.S. 3,056,835. The carbodiimides so produced are useful, inter alia, in the stabilization of polyesters in accordance with the procedures described in U.S. Patents 3,193,523; 3,193,524 and 3,193,525.

The following examples describe the manner and process of making and using the invention and set forth the best mode contemplated by the inventors of carrying out the invention but are not to be construed as limiting.

EXAMPLE 1

A solution of 15.1 g. (0.08 mole) of methyl N-(3-chlorophenyl)carbamate in 150 ml. of chlorobenzene was heated under reflux while phosgene was passed into the mixture at a rate of 1 g. per minute. No reaction had taken place at the end of 109 minutes of such treatment. A total of 0.45 g. (3% by weight of the urethane) of dimethylformamide was added, in 3 portions of 0.15 g. each, to the reaction mixture over a period of 4 hours and 20 minutes while refluxing. Passage of phosgene was continued for a further 100 minutes after addition of the dimethylformamide was complete. The resulting mixture was then purged with nitrogen at reflux for 34 minutes before removing the chlorobenzene by distillation at atmospheric pressure. The residue was distilled under reduced pressure to obtain 4.9 g. (40% yield) of m-chlorophenyl isocyanate having a boiling point of 58 to 62° C. at 2.2 mm. of mercury.

EXAMPLE 2

*1,2,2,2-tetrachloroethyl isocyanate*

A mixture of 18.8 (0.08 mole) of ethyl N-(1-hydroxy-2,2,2-trichloroethyl)carbamate in 180 ml. of chlorobenzene was heated under reflux while phosgene was passed into the solution at a rate of 1 g. per minute and a solution of 0.94 g. (5% based on urethane) of dimethylformamide in chlorobenzene was added dropwise over a period of 18 minutes. After the addition of dimethylformamide was complete refluxing and passage of phosgene at the same rate was continued for approximately 2 hours at the end of which time 10 ml. of 2% w./w. solution of dimethylformamide in chlorobenzene was added dropwise over a period of 8 minutes. Refluxing and passage of phosgene were continued for a further 1 hr. 20 min. before the addition of a second 10 ml. portion of 2% w./w. solution of dimethylformamide in chlorobenzene over a period of 45 minutes. After the addition was complete the refluxing and passage of phosgene was continued for a period of 25 minutes before purging the mixture with nitrogen for 10 minutes. The resulting mixture was distilled to remove chlorobenzene and the residue was distilled under reduced pressure to obtain 2.2 g. of 1,2,2,2-tetrachloroethyl isocyanate in the form of a liquid having a boiling point of 41 to 54° C. at 7.5 mm. of mercury.

The ethyl N-(1-hydroxy-2,2,2-trichloroethyl)carbamate employed as starting material in the above process was obtained as follows. A total of 30 ml. of concentrated hydrochloric acid was added dropwise with stirring to a mixture of 35.6 g. (0.4 mole) of urethane and 59 g. (0.4 mole) of chloral. The resulting mixture cooled to about 25° C. and the solid which had separated was isolated by filtration. There was thus obtained 77.6 g. of ethyl N-(1 - hydroxy-2,2,2 - trichloroethyl)carbamate having a melting point of 103° C.

EXAMPLE 3

Benzyl isocyanate

A mixture of 8.9 g. (0.05 mole) of ethyl N-benzylcarbamate, 0.44 g. (5% by weight of urethane) of dimethylformamide and 90 ml. of toluene was heated under reflux while a stream of phosgene was passed into the mixture at a rate of 1 g. per minute for 3 hr. and 35 minutes. The resulting mixture was purged with nitrogen at reflux for 10 minutes before distilling off the toluene at atmospheric pressure. The residue was distilled under reduced pressure to obtain 4.35 g. (65.4% theoretical yield) of benzyl isocyanate having a boiling point of 80° C. at 7 mm. of mercury.

EXAMPLE 4

1,2,2,2-tetrachloroethyl isocyanate

A mixture of 25.5 g. (0.1 mole) of ethyl N-(1,2,2,2-tetrachloroethyl)carbamate and 190 ml. of toluene was heated under reflux with stirring while phosgene was passed into the mixture at a rate of 1 g. per minute and a solution of 0.51 ml. of dimethylformamide in 20 ml. of toluene was added dropwise over a period of 65 minutes. After the addition was complete refluxing and passage of phosgene was continued for a further 2 hr. and 15 min. before addition of a second portion of 0.51 g. of dimethylformamide in 20 ml. of toluene was added over a period of about 1 hour. Refluxing and passage of phosgene was continued for a further 1 hr. 15 mins. before a third portion of 0.51 g. of dimethylformamide in 20 ml. of toluene was added over a period of about 1 hr. After addition was complete refluxing and passage of phosgene was continued for approximately 4 hrs. before purging the mixture with nitrogen. The resulting mixture was distilled at atmospheric temperature to remove toluene and the residue was distilled under reduced pressure. There was thus obtained 8.4 g. (40.2% theoretical yield) of 1,2,2,2-tetrachloroethyl isocyanate in the form of a liquid having a boiling point of 70 to 82° C. at 17 mm. of mercury.

The ethyl N-(1,2,2,2-tetrachloroethyl)carbamate empolyed as starting material in the above preparation was obtained as follows.

A mixture of 94.6 g. (0.4 mole) of ethyl N-(1-hydroxy-2,2,2-trichloroethyl)carbamate (prepared as described at the end of Example 2), 47.6 g. (0.4 mole) of thionyl chloride, 0.94 g. of pyridine and 500 ml. of methylene chloride was heated under reflux with stirring for 3 hrs. 25 minutes. The resulting mixture was evaporated to dryness to yield 99.25 g. of ethyl N-(1,2,2,2-tetrachloroethyl)carbamate having a melting point of 60 to 62° C.

EXAMPLE 5

Allyl isocyanate

A mixture of 11.5 g. (0.1 mole) of methyl N-allylcarbamate in 95 ml. of o-dichlorobenzene was maintained at 150° C. while phosgene was passed into the mixture at a rate of 1 g. per minute and a solution of 0.575 g. of dimethylformamide in 20 ml. of o-dichlorobenzene was added dropwise over a period of 1 hr. 22 mins. After the addition of the dimethylformamide was complete passage of phosgene at 150° C. was continued for 52 minutes before purging the mixture with nitrogen for 15 minutes. The resulting product was distilled at atmospheric pressure to obtain 4 g. (48.2% theoretical yield) of allyl isocyanate having a boiling point of 82° C. to 83° C.

Repetition of the above procedure using 23 g. of methyl N-allyl carbamate and 0.5 g. of dimethylformamide afforded 9.5 g. (57.2% theoretical yield) of allyl isocyanate.

EXAMPLE 6

Methylene diisocyanate

A mixture of 32.4 g. (0.2 mole) of N,N'-dicarbomethoxymethylenediamine and 160 ml. of 1,2,4-trichlorobenzene was heated at 150° C. and stirred while phosgene was passed into the mixture at a rate of 1 g. per minute and a solution of 0.65 g. of dimethylformamide in 20 ml. of trichlorobenzene was added dropwise over a period of 40 minutes. After the addition of dimethylformamide was complete the passage of phosgene was continued for a further 90 minutes before purging the mixture with nitrogen for 15 minutes. The resulting mixture was distilled at atmospheric pressure to give 2.75 g. of methylene diisocyanate.

EXAMPLE 7

1,2,2,2-tetrachloroethyl isocyanate

A mixture of 241 g. (1 mole) of methyl N-(1,2,2,2-tetrachloroethyl)carbamate in 100 ml. of toluene was heated under reflux with stirring while phosgene was added at a rate of approximately 4 g. per minute and a solution of 12 g. of dimethylformamide in 200 ml. of toluene was added dropwise with stirring over a period of 1 hr. 20 minutes. Refluxing and passage of phosgene at the same rate was continued for 40 minutes before a second portion of dimethylformamide (1.25 g. of dimethylformamide in 50 ml. of toluene) was added dropwise over a period of 40 minutes. Refluxing and passage of phosgene at the same rate was continued for a further 1 hr. before purging the mixture with nitrogen. The resulting mixture was distilled at atmospheric pressure to remove the toluene and the residue was distilled under reduced pressure to obtain 92.4 g. (44.4% theoretical yield) of 1,2,2,2-tetrachloroethyl isocyanate having a boiling point of 82° C. at 16 mm.

The methyl N-(1,2,2,2-tetrachloroethyl)carbamate empolyed as starting material in the above procedure was prepared by reaction of methylcarbamate and chloral using the procedure described at the end of Example 2, to give methyl N-(1-hydroxy-2,2,2-trichloroethyl)carbamate followed by reaction of the latter with thionyl chloride using the procedure described at the end of Example 4.

EXAMPLE 8

Using the procedure described in Example 1, but replacing dimethylformamide by N,N-dimethylacetamide, there is obtained m-chlorophenyl isocyanate in comparable yield.

Similarly, using the procedure described in Example 1, but replacing dimethylformamide by N,N-diisopropylacetamide, N,N-dimethylbutyramide, N,N-dimethylhexanoamide, N,N,N',N'-tetramethylurea, N,N-dimethyl-N',N'-diethylurea, N,N-diisopropyl-N',N'-diethylurea, N,N-dihexyl-N',N'-dimethylurea, N,N'-dimethyl-N,-N'-diethylurea, or N-methyl pyrrolidone there is obtained m-chlorophenyl isocyanate in comparable yield.

EXAMPLE 9

Using the procedure described in Example 1, but replacing methyl N-(3-chlorophenyl)carbamate by ethyl N-phenylcarbamate, there is obtained phenyl isocyanate.

Similarly, using the procedure described in Example 1, but replacing methyl N-(3-chlorophenyl)carbamate by N,N' - dicarbethoxy-p-phenylenediamine, N,N',N'' - tricarbethoxy-4,4',4''-methylidynetrisaniline, N,N' - dicarbethoxy - 4,4' - methylenedianiline, ethyl N-cyclohexylcarbamate, propyl N - diphenylcarbamate, N,N'-dicarbethoxy - 1 - methyl - 2,4 - phenylenediamine, ethyl N-1-naphthylcarbamate, ethyl N-dodecylcarbamate, methyl N-2-hexenylcarbamate, ethyl N - 1 - naphthylmethylcarbamate, and ethyl N-1-cyclohexenylcarbamate, there are obtained p-phenylene diisocyanate, 4,4',4''-methylidynetris(phenyl isocyanate), 4,4' - methylenebis(phenyl isocyanate), cyclohexyl isocyanate, diphenyl isocyanate, 1-methyl-2,4-phenylene diisocyanate, 1-naphthyl isocyanate, dodecyl isocyanate, 2-hexenyl isocyanate, 1-naphthylmethyl isocyanate, and 1-cyclohexenyl isocyanate, respectively.

I claim:

1. A process for the preparation of an isocyanate selected from the class consisting of a hydrocarbyl isocyanate and a halo-substituted hydrocarbyl isocyanate wherein hydrocarbyl in both instances is from 1 to 18 carbon atoms, inclusive which comprises reacting, at a temperature within the range of 80° C., to 150° C., the corresponding lower-alkyl N-hydrocarbylurethane with phosgene in the presence of a catalytic amount of a compound having the formula R—$CONR_1R_2$ wherein $R_1$ and $R_2$ each represents lower-alkyl and R is selected from the group consisting of hydrogen, lower-alkyl and

—$NR_1R_2$

2. A process for the preparation of an isocyanate $A(NCO)_n$ wherein $n$ is an integer from 1 to 3, inclusive, and A is selected from the class consisting of hydrocarbyl and halo-substituted hydrocarbyl wherein hydrocarbyl in each instance is from 1 to 18 carbon atoms, inclusive, and has a valency of $n$, which comprises reacting, at a temperature within the range of 80° C. to 150° C., the corresponding carbamate having the formula $$A-(NH\underset{\underset{O}{\|}}{C}OR_3)_n$$

wherein $R_3$ represents lower-alkyl and A and $n$ are as hereinbefore defined with phosgene in the presence of an inert organic solvent and a catalytic amount of a compound having the formula R—$CONR_1R_2$ wherein $R_1$ and $R_2$ each represents lower-alkyl and R is selected from the group consisting of hydrogen, lower-alkyl and

—$NR_1R_2$

3. A process for the preparation of a hydrocarbyl monoisocyanate, wherein hydrocarbyl is from 1 to 18 carbon atoms, inclusive, which comprises reacting, at a temperature within the range of 80° to 150° C., the corresponding lower - alkyl N - hydrocarbylcarbamate, wherein the hydrocarbyl radical corresponds to that of the desired isocyanate, with phosgene in the presence of an inert organic solvent and a catalytic amount of a compound having the formula R—$CONR_1R_2$ wherein $R_1$ and $R_2$ each represents lower-alkyl and R is selected from the group consisting of hydrogen, lower-alkyl and

—$NR_1R_2$

4. A process for the preparation of a hydrocarbyl diisocyanate wherein hydrocarbyl is from 1 to 18 carbon atoms, inclusive, which comprises reacting, at a temperature within the range of 80° C. to 150° C., the N,N'-dicarbalkoxy derivative of the corresponding hydrocarbyl diamine with phosgene in the presence of an inert organic solvent and a catalytic amount of a compound having the formula R—$CONR_1R_2$ wherein $R_1$ and $R_2$ each represent lower-alkyl and R is selected from the group consisting of hydrogen, lower-alkyl and —$NR_1R_2$.

5. A process for the preparation of 3-chlorophenyl isocyanate which comprises reacting, at a temperature within the range of 80° C. to 150° C., a lower-alkyl N-(3-chlorophenyl)carbamate with phosgene in the presence of an inert organic solvent and a catalytic amount of dimethylformamide.

6. A process for the production of 1,2,2,2-tetrachloroethyl isocyanate which comprises reacting, at a temperature within the range of 80° C. to 150° C., a lower-alkyl N-(1-hydroxy-2,2,2-trichloroethyl)carbamate with phosgene in the presence of an inert organic solvent and a catalytic amount of dimethylformamide.

7. A process for the production of 1,2,2,2-tetrachloroethyl isocyanate which comprises reacting, at a temperature within the range of 80° C. to 150° C., a lower-alkyl N-(1,2,2,2-tetrachloroethyl)carbamate with phosgene in the presence of an inert organic solvent and a catalytic amount of dimethylformamide.

8. A process for the production of benzyl isocyanate which comprises reacting, at a temperature within the range of 80° C. to 150° C., a lower-alkyl N-allylcarbamate with phosgene in the presence of an inert organic solvent and a catalytic amount of dimethylformamide.

9. A process for the production of alkyl isocyanate which comprises reacting, at a temperature within the range of 80° C., to 150° C., a lower-alkyl N-allylcarbamate with phosgene in the presence of an inert organic solvent and a catalytic amount of dimethylformamide.

10. A process for the production of methylene diisocyanate which comprises reacting, at a temperature within the range of 80° C., to 150° C., N,N'-dicarbalkoxy methylene diamine with phosgene in the presence of an inert organic solvent and a catalytic amount of dimethylformamide.

References Cited

UNITED STATES PATENTS 2,409,712  10/1946  Schweitzer _____ 260—453
2,713,591  7/1955  Bortnick _____ 260—453

FOREIGN PATENTS 485,761  5/1938  Great Britain.

OTHER REFERENCES

Arnold: Chemical Abstracts, vol. 53, page 4112, (1959).

CHARLES B. PARKER, *Primary Examiner.*

D. H. TORRENCE, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,170                           October 1, 1968

Henri Ulrich

It is certified that error appears in the above identified patent and that said Letters Patent are hereby corrected as shown below:

Column 2, line 2, "benzhdryl" should read -- benzhydryl -- Column 7, line 19, "propyl N-diphenylcarbamate" should read -- propyl N-diphenylylcarbamate --; line 26, "diphenyl isocyana should read -- diphenylyl isocyanate --. Column 8, line 39, "N-allyl" should read -- N-benzyl --; line 43, "alkyl" should read -- allyl --.

Signed and sealed this 17th day of February 1970.

(SEAL)
Attest:

Edward M. Fletcher, Jr.                      WILLIAM E. SCHUYLER, JR.
Attesting Officer                              Commissioner of Patents